// United States Patent //

Kawamura et al.

(10) Patent No.: US 9,926,931 B2
(45) Date of Patent: Mar. 27, 2018

(54) MOTOR-DRIVEN COMPRESSOR

(71) Applicant: KABUSHIKI KAISHA TOYOTA JIDOSHOKKI, Kariya-shi, Aichi-ken (JP)

(72) Inventors: Shinichi Kawamura, Kariya (JP); Akimitsu Ichihara, Kariya (JP); Takashi Kawashima, Kariya (JP)

(73) Assignee: KABUSHIKI KAISHA TOYOTA JIDOSHOKKI, Kariya-Shi, Aichi-Ken (JP)

( * ) Notice: Subject to any disclaimer, the term of this patent is extended or adjusted under 35 U.S.C. 154(b) by 226 days.

(21) Appl. No.: 15/075,381

(22) Filed: Mar. 21, 2016

(65) Prior Publication Data

US 2016/0281716 A1 Sep. 29, 2016

(30) Foreign Application Priority Data

Mar. 26, 2015 (JP) ................................. 2015-064776

(51) Int. Cl.

| F04C 28/08 | (2006.01) |
| F04C 18/02 | (2006.01) |
| F04C 23/00 | (2006.01) |
| F04C 28/06 | (2006.01) |
| H02P 21/34 | (2016.01) |
| H02P 21/36 | (2016.01) |

(52) U.S. Cl.

CPC .......... F04C 28/08 (2013.01); F04C 18/0215 (2013.01); F04C 23/008 (2013.01); F04C 28/06 (2013.01); H02P 21/34 (2016.02); H02P 21/36 (2016.02); F04C 2240/403 (2013.01); F04C 2240/81 (2013.01); F04C 2270/0525 (2013.01); F04C 2270/72 (2013.01)

(58) Field of Classification Search

CPC ....................................................... F04C 28/08
USPC ....................................................... 318/3, 34
See application file for complete search history.

(56) References Cited

U.S. PATENT DOCUMENTS

| 4,753,078 A | * 6/1988 | Gardner, Jr. .............. B60L 8/00 180/305 |
| 5,263,822 A | 11/1993 | Fujio |

FOREIGN PATENT DOCUMENTS

| JP | 3-145590 A | 6/1991 |
| JP | 2003-120555 A | 4/2003 |
| JP | 2005-171843 A | 6/2005 |

OTHER PUBLICATIONS

Communication dated May 30, 2017 issued by the Japanese Patent Office in counterpart application No. 2015-064776.

* cited by examiner

*Primary Examiner* — David S Luo (74) *Attorney, Agent, or Firm* — Sughrue Mion, PLLC (57) ABSTRACT

A motor-driven compressor is provided with a motor including a rotor, a housing including an inlet through which low-pressure refrigerant serving as a low-pressure fluid is drawn in, a compression unit that compresses the low-pressure refrigerant and discharges compressed high-pressure fluid, an inverter that drives the motor, and a controller that controls the inverter. If the rotor is activating in a reverse direction that is opposite to a forward direction when activating the motor, the controller obtains a position of a d-axis of the rotor and controls the inverter so that current flows to the obtained d-axis and so that frequency of current flowing to the motor decreases as time elapses.

7 Claims, 5 Drawing Sheets

MOTOR-DRIVEN COMPRESSOR

BACKGROUND OF THE INVENTION

The present invention relates to a motor-driven compressor.

Japanese Laid-Open Patent Publication No. 2003-120555 describes a motor-driven compressor including a compression unit and a motor. The compression unit includes a fixed scroll and a movable scroll, which is capable of orbiting the fixed scroll. The motor orbits the movable scroll. Further, the motor-driven compressor includes a compression chamber defined by the fixed scroll and the movable scroll. The motor-driven compressor orbits the movable scroll to compress low-pressure fluid, which is drawn into the compression chamber, and discharges compressed high-pressure fluid.

Further, Japanese Laid-Open Patent Publication No. 2003-120555 describes a motor-driven compressor and an air-conditioner that includes the motor-driven compressor. The motor-driven compressor includes an injection port that draws in intermediate-pressure fluid, which has a higher pressure than the low-pressure fluid. The air-conditioner includes an injection pipe, which is connected to the injection port of the motor-driven compressor, and a gas-liquid separator, which is connected to the injection pipe. In the air-conditioner, intermediate-pressure fluid is obtained by the gas-liquid separator. The intermediate-pressure fluid flows through the injection pipe and the injection port and enters the compression chamber.

In the above structure, when the motor-driven compressor stops operating, the residual intermediate-pressure fluid in the injection pipe may enter the compression chamber through the injection port. This may cause the movable scroll to orbit in a reverse direction opposite to the forward direction. In such a case, the movable scroll will rotate a rotor of the motor in a reverse direction opposite to the forward direction.

When the rotor is rotated in the reverse direction, activation of the motor-driven compressor may be suspended until the reverse rotation of the rotor stops. However, it may take time until the reverse rotation of the rotor stops. This would increase the time required to activate the motor-driven compressor and lower the responsiveness of the motor-driven compressor.

SUMMARY OF THE INVENTION

It is an object of the present invention to provide a motor-driven compressor that may be quickly activated even when the rotor is rotating in the reverse direction.

One aspect of the present invention is a motor-driven compressor provided with a motor including a rotor, a housing including an inlet through which low-pressure fluid is drawn, and a compression unit that compresses the low-pressure fluid and discharges compressed high-pressure fluid. The compression unit includes a fixed scroll fixed to the housing, a movable scroll engaged with the fixed scroll and capable of orbiting the fixed scroll, and a compression chamber defined by the fixed scroll and the movable scroll. The compression unit compresses the low-pressure fluid drawn into the compression chamber when the rotor rotates in a predetermined forward direction by orbiting the movable scroll in a forward direction. The motor-driven compressor is further provided with a drive circuit that drives the motor, a controller that controls the drive circuit, an injection port that draws into the compression chamber intermediate-pressure fluid having a higher pressure than the low-pressure fluid and a lower pressure than the high-pressure fluid, and a position obtaining unit that obtains a position of a d-axis of the rotor. If the rotor is rotating in a reverse direction that is opposite to the forward direction when activating the motor, the controller executes a deceleration control that controls the drive circuit so that current flows to the d-axis of the rotor obtained by the position obtaining unit and so that frequency of current flowing to the motor decreases as time elapses.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a motor-driven compressor will now be described.

Figure 1:
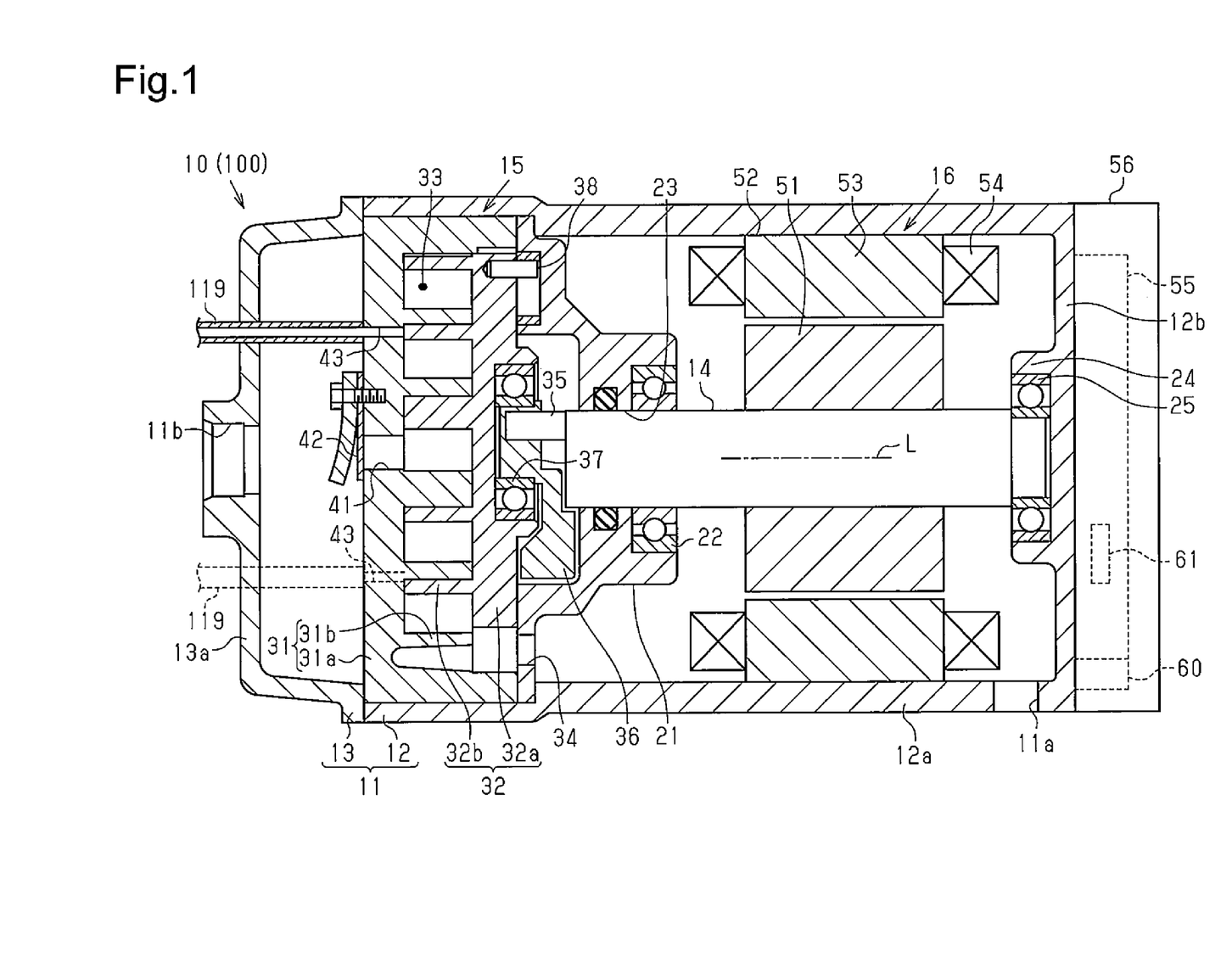
FIG. 1 is a cross-sectional view of a motor-driven compressor according to the present invention.

As shown in FIG. 1, the motor-driven compressor 10 includes a housing 11. The housing 11 includes an inlet 11a, through which fluid is drawn, and an outlet 11b, through which fluid is discharged. Further, the housing 11, which is generally cylindrical as a whole, includes two cylindrical parts 12 and 13, each having a closed end. The first part 12 is coupled to the second part 13 with their open ends joined with each other. The inlet 11a is located in a side wall 12a of the first part 12 in the vicinity of an end wall 12b. The outlet 11b is located in an end wall 13a of the second part 13.

Further, the motor-driven compressor 10 includes a rotation shaft 14, a compression unit 15, and a motor 16. The compression unit 15 compresses and discharges the fluid drawn from the inlet 11a. The motor 16 drives the compression unit 15. The rotation shaft 14, the compression unit 15, and the motor 16 are accommodated in the housing 11. The motor 16 is located in the vicinity of the inlet 11a in the housing 11. The compression unit 15 is located in the vicinity of the outlet 11b in the housing 11.

The rotation shaft 14 is accommodated in the housing 11 in a rotational manner. A shaft support 21 is arranged in the housing 11 to support the rotation shaft 14. The shaft support 21 is fixed to the housing 11 between the compression unit 15 and the motor 16. The shaft support 21 includes an insertion hole 23 through which the rotation shaft 14 is inserted. A first bearing 22 is arranged in the insertion hole 23 of the shaft support 21. The shaft support 21 is opposed to the end wall 12b of the first part 12. A tubular boss 24 projects from the end wall 12b of the first part 12. A second bearing 25 is arranged in the boss 24. The rotation shaft 14 is supported for rotation by the two bearings 22 and 25.

The compression unit 15 includes a fixed scroll 31, which is fixed to the housing 11, and a movable scroll 32, which is capable of orbiting the fixed scroll 31. The fixed scroll 31 includes a disk-shaped fixed base plate 31a, which is coaxial with the rotation shaft 14, and a fixed spiral wall 31b, which projects from the fixed base plate 31a. The movable scroll 32 includes a disk-shaped movable base plate 32a, which is opposed to the fixed base plate 31a, and a movable spiral wall 32b, which projects from the movable base plate 32a toward the fixed base plate 31a.

Figure 2:
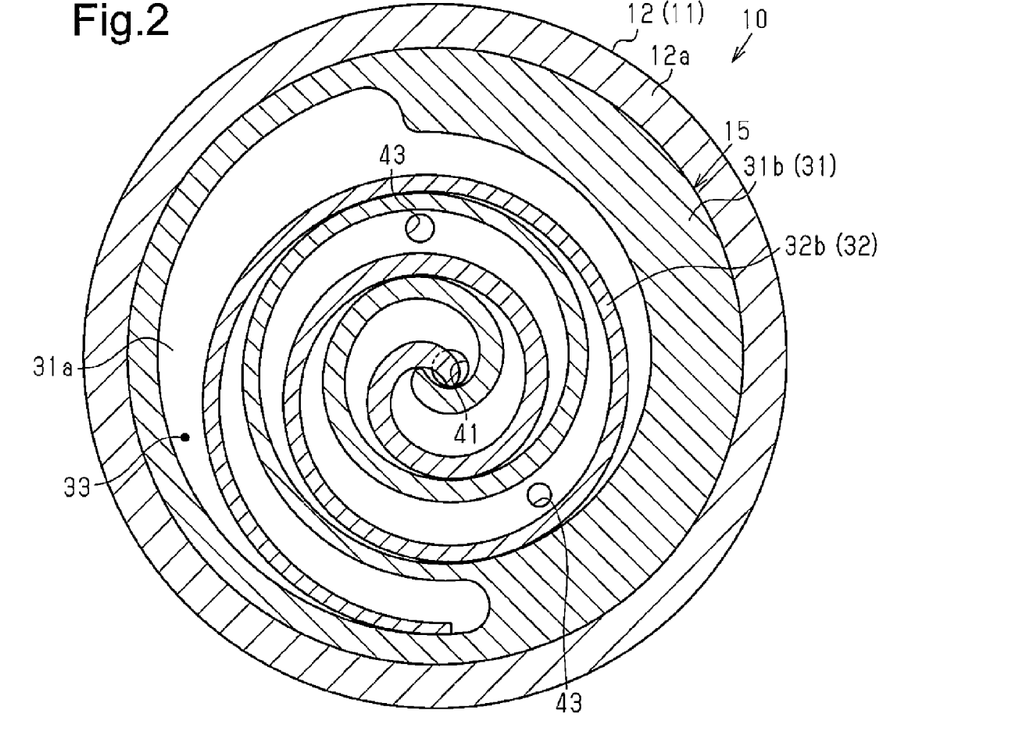
FIG. 2 is a cross-sectional view of a compression unit.

As shown in FIGS. 1 and 2, the fixed scroll 31 and the movable scroll 32 are engaged with each other. More specifically, the fixed spiral wall 31b and the movable spiral wall 32b are engaged with each other. The distal surface of the fixed spiral wall 31b is in contact with the movable base plate 32a, and the distal surface of the movable spiral wall 32b is in contact with the fixed base plate 31a. The compression unit 15 includes a compression chamber 33 defined by the fixed scroll 31 and the movable scroll 32. As shown in FIG. 1, the shaft support 21 includes a suction passage 34, through which fluid from the inlet 11a is drawn.

Rotation of the rotation shaft 14 orbits the movable scroll 32 relative to the fixed scroll 31. A portion of the rotation shaft 14 is inserted through the insertion hole 23 of the shaft support 21 and projected toward the compression unit 15. An end surface of the rotation shaft 14 in the vicinity of the compression unit 15 includes an eccentric rod 35. The eccentric rod 35 is offset from the axis L of the rotation shaft 14. A bushing 36 is arranged on the eccentric rod 35. The bushing 36 is coupled to the movable base plate 32a of the movable scroll 32 by a bearing 37. The motor-driven compressor 10 includes rotation restriction pins 38, which permit orbiting of the movable scroll 32 relative to the fixed scroll 31 and restrict rotation of the movable scroll 32.

In the above structure, when the rotation shaft 14 rotates in the forward direction, the movable scroll 32 orbits in the forward direction relative to the fixed scroll 31. More specifically, the movable scroll 32 orbits about the axis of the fixed scroll 31, that is, the axis L of the rotation shaft 14. This decreases the volume of the compression chamber 33 and compresses the fluid in the compression chamber 33 drawn from the suction passage 34. The compressed fluid flows out of a discharge port 41, which is located in the fixed base plate 31a, and is discharged from the outlet 11b. The forward direction refers to the direction in which normal fluid compression is performed.

As shown in FIGS. 1 and 2, the fixed base plate 31a includes a discharge valve 42, which covers the discharge port 41. The fluid compressed in the compression chamber 33 forcibly opens the discharge valve 42 and flows out of the discharge port 41. The fixed base plate 31a includes two injection ports 43, which are separate from the discharge port 41. The injection ports 43 are located outward in the radial direction from the discharge port 41. An injection pipe 119 is connected to each injection port 43.

The motor 16 rotates the rotation shaft 14 and orbits the movable scroll 32 relative to the fixed scroll 31. The motor 16 includes a tubular rotor 51, which rotates integrally with the rotation shaft 14, and a stator 52, which encompasses the rotor 51. The rotor 51 is coupled to the rotation shaft 14. The rotor 51 includes permanent magnets (not shown). The stator 52, which is fixed to the inner surface of the first part 12, includes a stator core 53, and coils 54, which are wound around the stator core 53. The stator core 53 is opposed to the rotor 51 in the radial direction.

The motor-driven compressor 10 includes an inverter 55, which serves as a drive circuit that drives the motor 16. A tubular cover 56 is attached to the end wall 12b of the first part 12 of the housing 11. The inverter 55 is accommodated in the cover 56. The inverter 55 is electrically connected to the coils 54. The motor-driven compressor 10 is installed in a vehicle for use with a vehicle air-conditioner 100. The fluid compressed by the motor-driven compressor 10 is a refrigerant. The vehicle air-conditioner 100 will now be described in detail.

Figure 3:
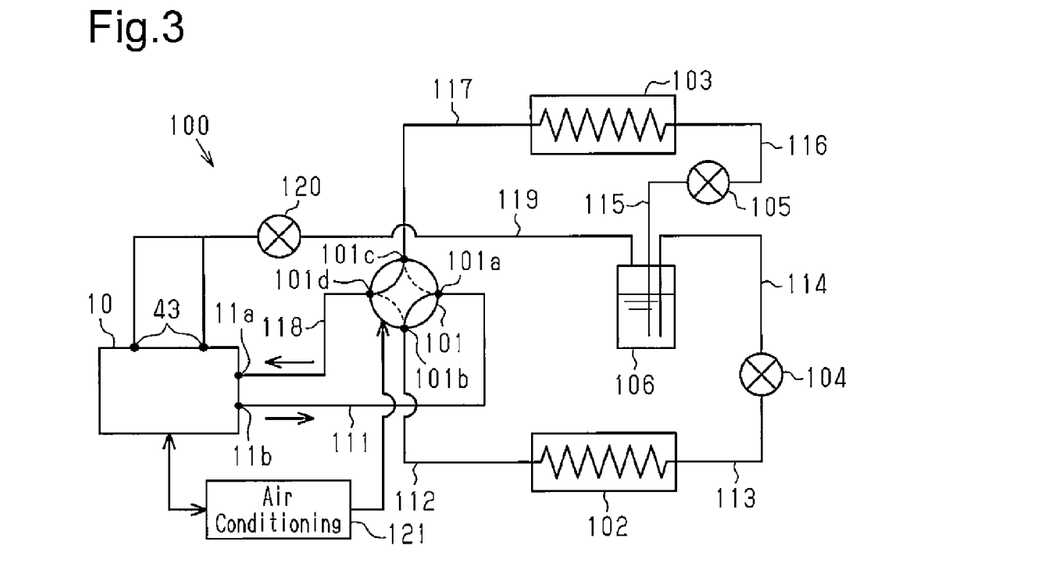
FIG. 3 is a schematic diagram illustrating the configuration of a vehicle air-conditioner.

As shown in FIG. 3, the vehicle air-conditioner 100 includes a pipe switch valve 101, a first heat exchanger 102, a second heat exchanger 103, a first expansion valve 104, a second expansion valve 105, and a gas-liquid separator 106. The pipe switch valve 101 includes a plurality of ports 101a to 101d. The pipe switch valve 101 is switched to a first state or a second state. In the first state, the first port 101a is in communication with the second port 101b, and the third port 101c is in communication with the fourth port 101d. In the second state, the first port 101a is in communication with the third port 101c, and the second port 101b is in communication with the fourth port 101d.

The vehicle air-conditioner 100 includes a first pipe 111, which connects the first port 101a and the outlet 11b of the motor-driven compressor 10, a second pipe 112, which connects the second port 101b and the first heat exchanger 102, and a third pipe 113, which connects the first heat exchanger 102 and the first expansion valve 104. Further, the vehicle air-conditioner 100 includes a fourth pipe 114, which connects the first expansion valve 104 and the gas-liquid separator 106, a fifth pipe 115, which connects the gas-liquid separator 106 and the second expansion valve 105, a sixth pipe 116, which connects the second expansion valve 105 and the second heat exchanger 103, and a seventh pipe 117, which connects the second heat exchanger 103 and the third port 101c. The vehicle air-conditioner 100 also includes an eighth pipe 118, which connects the fourth port 101d and the inlet 11a of the motor-driven compressor 10. A check valve 120 is arranged in the injection pipe 119.

The vehicle air-conditioner 100 is capable of performing a cooling operation and a warming operation. The vehicle air-conditioner 100 includes an air conditioning ECU 121 that entirely controls the vehicle air-conditioner 100 including the pipe switch valve 101. When performing a cooling operation, the air conditioning ECU 121 switches the pipe switch valve 101 to the first state. In this case, the refrigerant discharged from the outlet 11b of the motor-driven compressor 10 flows to the first heat exchanger 102 where the refrigerant exchanges heat with the ambient air. This condenses the refrigerant. The first expansion valve 104 depressurizes the condensed refrigerant, which then flows to the gas-liquid separator 106 where the condensed refrigerant is separated into liquid and gas. The liquid refrigerant, which is depressurized by the second expansion valve 105, flows to the second heat exchanger 103, where the liquid refrigerant exchanges heat with the air in the passenger compartment. This vaporizes the liquid refrigerant and cools the passenger compartment. Further, the refrigerant vaporized at the second heat exchanger 103 flows toward the inlet 11a of the motor-driven compressor. The check valve 120 is closed during the cooling operation.

When performing a warming operation, the air conditioning ECU 121 switches the pipe switch valve 101 to the second state. In this case, the refrigerant discharged from the outlet 11b of the motor-driven compressor 10 flows to the second heat exchanger 103 where the refrigerant exchanges heat with the air in the passenger compartment. This condenses the refrigerant and heats the air in the passenger compartment. The second expansion valve 105 depressurizes the refrigerant condensed by the second heat exchanger 103. The refrigerant then flows to the gas-liquid separator 106 where the condensed refrigerant is separated into liquid and gas. The liquid refrigerant, which is depressurized by the first expansion valve 104, flows to the first heat exchanger 102, where the liquid refrigerant exchanges heat with the ambient air and vaporizes. The vaporized refrigerant flows toward the inlet 11a of the motor-driven compressor 10. The check valve 120 is open during the warming operation.

The gas refrigerant obtained by the gas-liquid separator 106 flows through the injection pipe 119 and the injection ports 43 to the compression chamber 33 of the motor-driven compressor 10. This increases the amount of refrigerant that flows into the compression chamber 33. The pressure of the gas refrigerant drawn into the compression chamber 33 from the injection ports 43 is higher than the pressure of the refrigerant drawn from the inlet 11a and lower than the pressure of the refrigerant discharged from the outlet 11b. In the description hereafter, the refrigerant drawn from the inlet 11a is referred to as the low-pressure refrigerant, the refrigerant discharged from the outlet 11b is referred to as the high-pressure refrigerant, and the refrigerant drawn into the compression chamber 33 from the injection ports 43 is referred to as the intermediate-pressure refrigerant.

In the vehicle air-conditioner 100, after the motor-driven compressor 10 stops operating, the residual intermediate-pressure refrigerant in the injection pipe 119 may flow into the compression chamber 33. This may cause the movable scroll 32 to orbit in a reverse direction opposite to the forward direction and rotate the rotor 51 of the motor 16 in a reverse direction opposite to the forward direction. Even when such reverse rotation occurs, the motor-driven compressor 10 of the present embodiment may be efficiently activated.

The configuration for efficiently activating the motor-driven compressor 10 will now be described. First, the electric configuration of the coils 54 and the inverter 55 will be described.

Figure 4:
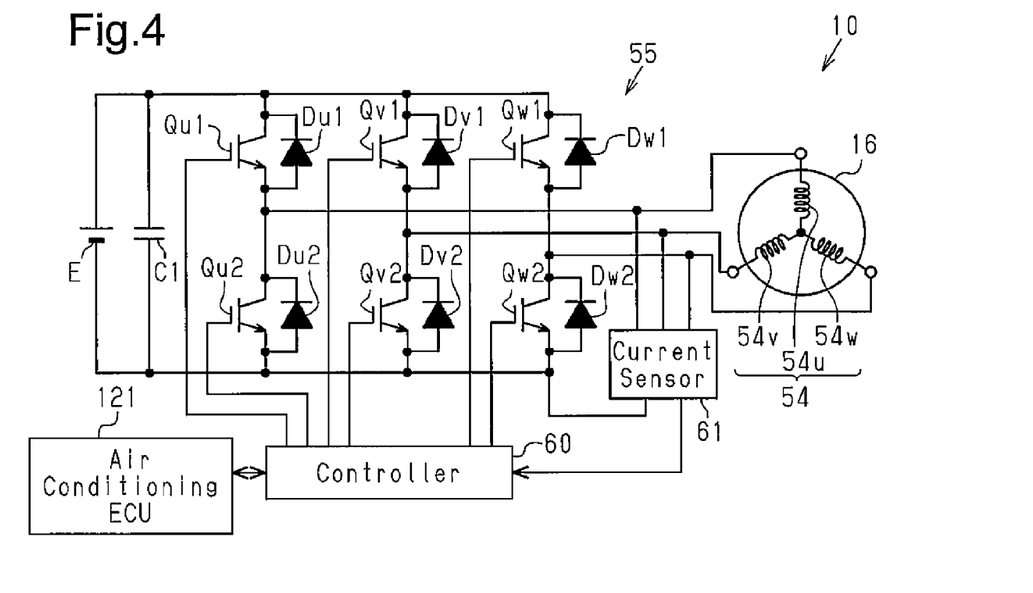
FIG. 4 is a circuit diagram illustrating the configuration of an inverter.

Referring to FIG. 4, the motor 16 is a three-phase motor. Thus, the coils 54 have a three-phase structure including a u-phase coil 54u, a v-phase coil 54v, and a w-phase coil 54w. The phase coils 54u, 54v, and 54w form a Y-configuration.

The inverter 55, which is a three-phase inverter, includes u-phase power switching elements Qu1 and Qu2, which correspond to the u-phase coil 54u, v-phase power switching elements Qv1 and Qv2, which correspond to the v-phase coil 54v, and w-phase power switching elements Qw1 and Qw2, which correspond to the w-phase coil 54w.

The power switching elements Qu1, Qu2, Qv1, Qv2, Qw1, and Qw2 (hereafter simply referred to as the power switching elements Qu1 to Qw2) are each formed by an insulated-gate bipolar transistor (IGBT). The u-phase power switching elements Qu1 and Qu2 are connected to each other in series by a connection wire, which is connected to the u-phase coil 54u. The series-connected unit of u-phase power switching elements Qu1 and Qu2 receives DC power from a DC power supply E. The other power switching elements Qv1, Qv2, Qw1, and Qw2 are configured in the same manner as the u-phase power switching elements Qu1 and Qu2 except for the corresponding coil and thus will not be described.

The inverter 55 includes flyback diodes Du1 to Dw2, which are connected in parallel to the power switching elements Qu1 to Qw2, and a smoothing capacitor C1, which is connected in parallel to the DC power supply E. In the description hereafter, the power switching elements Qu1, Qv1, and Qw1 will simply be referred to as the upper arms, and the power switching elements Qu2, Qv2, and Qw2 will simply be referred to as the lower arms.

The motor-driven compressor 10 includes a controller 60 that controls the switching operations of the power switching elements Qu1 to Qw2 in the inverter 55. The controller 60 cyclically activates and deactivates the power switching elements Qu1 to Qw2 to drive the motor 16 and rotate the rotor 51.

The controller 60 PWM-controls the inverter 55. More specifically, the controller 60 uses a carrier signal (carrier wave signal) and a command voltage signal (comparison subject signal) to generate a control signal. The controller 60 uses the generated control signal to variably control the activation-deactivation duty ratio of the power switching elements Qu1 to Qw2 and convert the DC power from the DC power supply E to AC power having the desired frequency. The AC power is supplied to the motor 16 to drive the rotor 51.

The controller 60 controls the activation and deactivation of the power switching elements Qu1 to Qw2 to control the rotation speed and rotation direction of the rotor 51. In particular, the controller 60 rotates the rotor 51 in the forward direction or the reverse direction and gradually accelerates or decelerates the rotor 51. The controller 60 controls the current flowing to the motor 16. More specifically, the controller 60 decreases the frequency of phase currents Iu, Iv, and Iw to decelerate the rotor 51 or increases the frequency of the phase currents Iu, Iv, and Iw to accelerate the rotor 51.

The controller 60 and the air conditioning ECU 121, which are electrically connected, exchange information between each other. In response to requests, failure determinations, and the like from the air conditioning ECU 121, the controller 60 starts or stops operation of the motor-driven compressor 10. The operation of the motor-driven compressor 10 is stopped when the supply of AC power to the motor 16 is stopped. More specifically, the operation of the motor-driven compressor 10 is stopped when the activation-deactivation control of the power switching elements Qu1 to Qw2 is stopped.

As shown in FIG. 4, the motor-driven compressor 10 includes a current sensor 61, which serves as a current detector that detects the phase currents Iu, Iv, and Iw. The current sensor 61 is connected to three wires connecting the inverter 55 and the motor 16 and to one of the lower arms. The current sensor 61 periodically detects the u-phase current Iu flowing to the u-phase coil 54u, the v-phase current Iv flowing to the v-phase coil 54v, and the w-phase current Iu flowing to the w-phase coil 54w. Then, the current sensor 61 transmits the detection result to the controller 60. This allows the controller 60 to obtain the phase currents Iu, Iv, and Iw. The current sensor 61 may have any configuration. For example, the current sensor 61 may include a shunt resistor connected in parallel to the lower arms.

When a predetermined restarting condition is satisfied, the controller 60 executes a restart control process to restart the motor-driven compressor 10. The restarting condition is not limited and may be, for example, the receipt of an activation request from the vehicle air-conditioner 100 within a predetermined specific period from when the motor-driven compressor 10 stops operating.

When the intermediate-pressure refrigerant from the injection ports 43 is drawn toward the compression chamber 33 as described above, the rotor 51 continues to rotate after the motor-driven compressor 10 stops operating over a longer period than the above specific period. In this case, the rotor 51 is still rotating in the reverse direction when the restart control process is executed.

Figure 5:
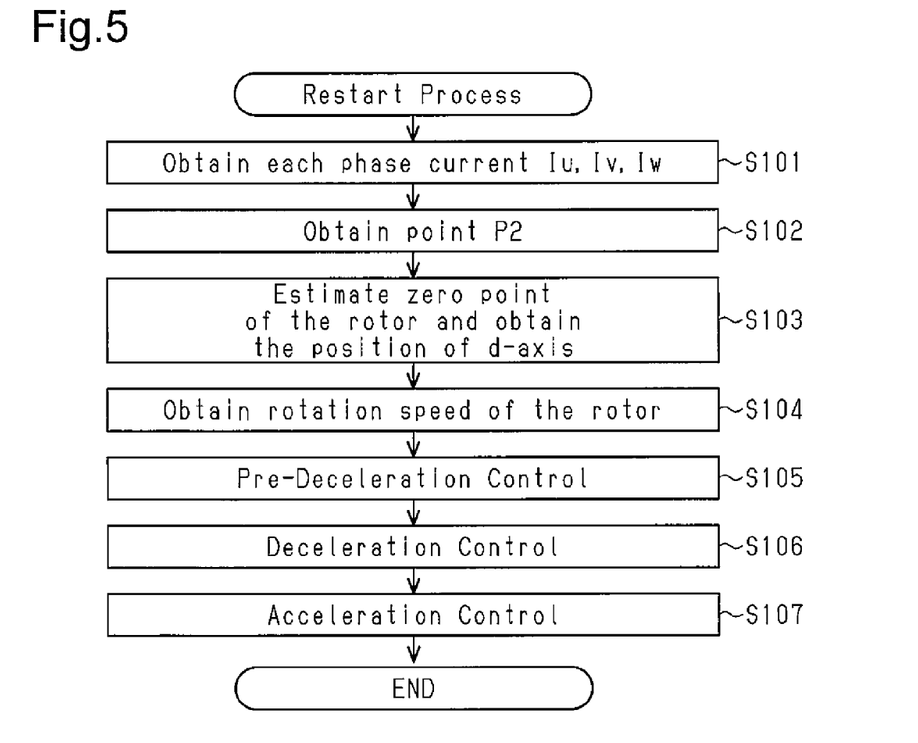
FIG. 5 is a flowchart illustrating a restart control process.

The restart control process will now be described with reference to FIG. 5.

First, in step S101, the controller 60 obtains the phase currents Iu, Iv, and Iw from the detection result of the current sensor 61. In detail, the controller 60 continuously deactivates all of the upper arms, which are the arms at the side that does not include the shunt resistor of the current sensor 61. Further, the controller 60 activates and deactivates the lower arms (power switching elements Qu2, Qv2, and Qw2), which are the arms at the side that includes the shunt resistor of the current sensor 61, sequentially in a predetermined cycle. Under a situation in which the lower arms are activated and deactivated as described above, the current sensor 61 detects the phase currents Iu, Iv, and Iw and transmits the detection result to the controller 60. This allows the controller 60 to obtain the induced current of each phase generated in each of the phase coils 54u, 54v, and 54w when the rotor 51 rotates in the reverse direction.

Based on the detection result of the current sensor 61 indicating the induced currents of the phase coils 54u, 54v, and 54w, the controller 60 estimates the rotational position of the rotor 51, that is, a zero point (reference point) of the rotational position of the rotor 51.

Figure 6:
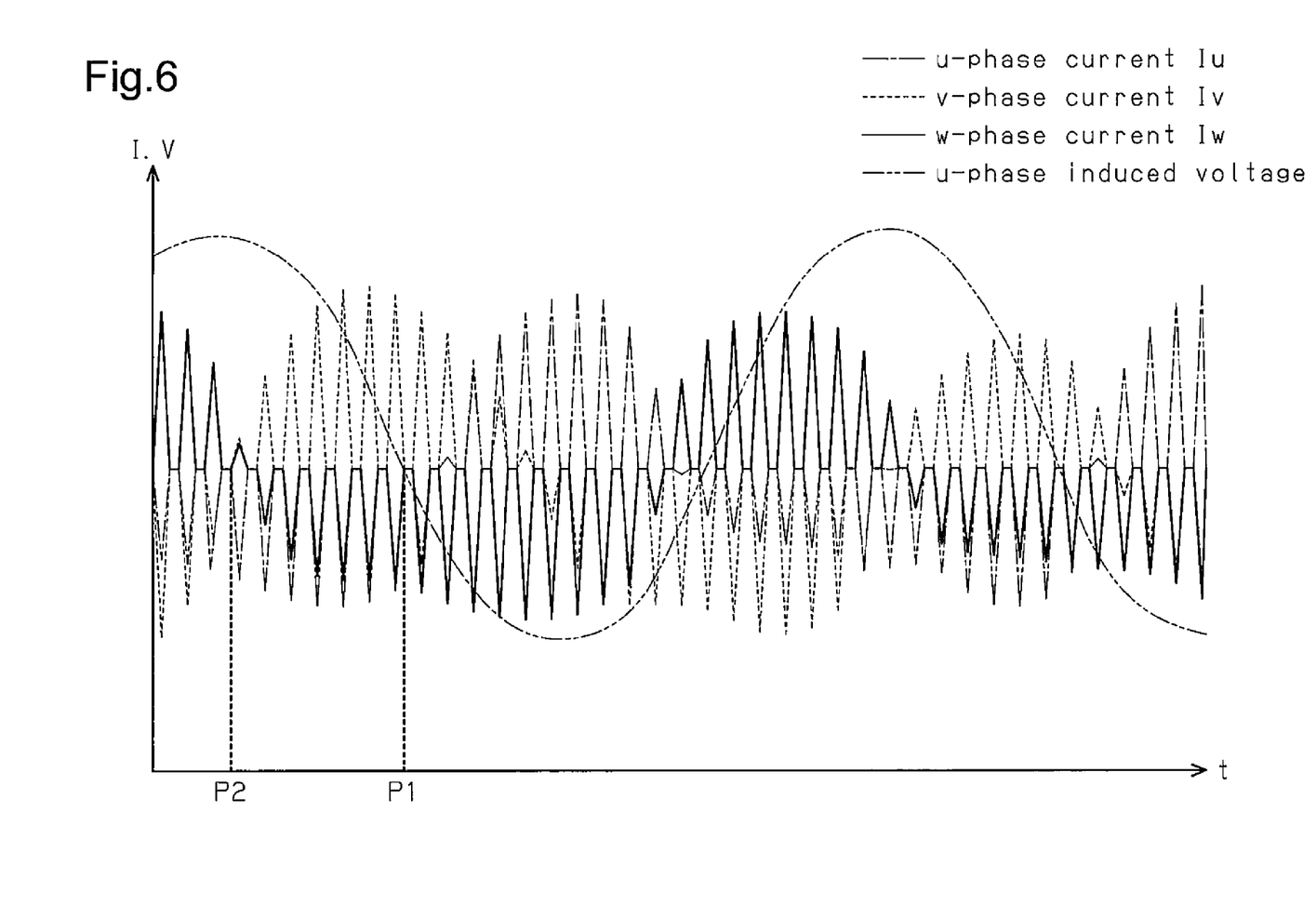
FIG. 6 is a graph illustrating the relationship between each phase current and the u-phase induced voltage.

The relationship of the zero point of the rotor 51 and the phase currents Iu, Iv, and Iw during reverse rotation of the rotor 51 will now be described with reference to FIG. 6, which is a graph schematically showing the phase currents Iu, Iv, and Iw that are obtained when the rotor 51 is rotating in the reverse direction. In addition to the phase currents Iu, Iv, and Iw, FIG. 6 shows the waveform of a u-phase induced voltage. In FIG. 6, the cycle of each minimum unit waveform (single triangular waveform) of the phase currents Iu, Iv, and Iw are shown longer than the actual cycle. Further, in FIG. 6, the minimum unit waveform of the phase currents Iu, Iv, and Iw are shown in phase.

As shown in FIG. 6, the phase currents Iu, Iv, and Iw, more specifically, the envelopes of the phase currents Iu, Iv, and Iw have different phases. Thus, the current phase having the maximum instantaneous value sequentially changes as time elapses.

The zero point of the rotor 51, the u-phase induced voltage, and the phase currents Iu, Iv, and Iw have a constant relationship. The zero point of the rotor 51 is point P1 at which the u-phase induced voltage changes from a positive (+) value to a negative (−) value. Point P1 is offset 90 degrees from point P2 at which the maximum instantaneous value changes from the w-phase current Iw to the v-phase current Iv. Point P2 may be referred to as the intersecting point of the envelope of the w-phase current Iw and the envelope of the v-phase current Iv.

The controller 60 uses the above relationship and the phase currents Iu, Iv, and Iw during reverse rotation of the rotor 51 to estimate the zero point of the rotor 51. In detail, referring to FIG. 5, in step S102, based on the phase currents Iu, Iv, and Iw during reverse rotation of the rotor 51, the controller 60 obtains point P2, at which the maximum instantaneous value of the three phase currents Iu, Iv, and Iw switches from the w-phase current Iw to the v-phase current Iv. Then, in step S103, the controller 60 uses point P2 to estimate point P1, at which the u-phase induced voltage changes from a positive value to a negative value, and uses estimated point P1 to estimate the zero point of the rotor 51.

Further, in step S103, the controller 60 obtains the position of a d-axis from the estimated zero point of the rotor 51. The controller 60 includes information related to the relative positional relationship of the zero point of the rotor 51 and the position of the d-axis of the rotor 51. The controller 60 refers to the information to obtain the position of the d-axis from the zero point. That is, the controller 60 obtains the position of the d-axis of the rotor 51 based on point P2. In the present embodiment, the controller 60 corresponds to a "position obtaining unit." The d-axis of the rotor is an axis extending in the same direction as the magnetic flux formed by a magnetic pole of the rotor 51. A q-axis is an axis that extends perpendicular to the d-axis. When the zero point coincides with the d-axis of the rotor 51, the zero point may be referred to as the d-axis.

In step S104, the controller 60 obtains the rotation speed of the rotor 51 based on the phase currents Iu, Iv, and Iw. More specifically, the controller 60 estimates the rotation speed of the rotor 51 from the cycle or the like of the phase currents Iu, Iv, and Iw. The process of step S104 executed by the controller 60 corresponds to a "rotation speed obtaining unit."

In step S105, the controller 60 executes pre-deceleration control that controls the inverter 55 so that the frequency of the current flowing through the motor 16 corresponds to the frequency corresponding to the rotation speed of the rotor 51 obtained in step S104. More specifically, the controller 60 activates and deactivates the power switching elements Qu1 to Qw2 so that current flows to the d-axis of the rotor 51 obtained in step S103 and the rotor 51 rotates in the reverse direction at the same rotation speed as that obtained in step S104. In other words, the controller 60 controls the activation and deactivation of the power switching elements Qu1 to Qw2 so that current flows to the d-axis of the rotor 51, which has been obtained in step S103. Consequently, the inverter 55 generates AC power having a frequency corresponding to the rotation speed obtained in step S104. The process of step S105 corresponds to the "pre-deceleration control."

The controller 60 executes the pre-deceleration control over a predetermined period. That is, the controller 60 controls the inverter 55 to keep rotating the rotor 51 in the reverse direction at a constant rotation speed over a predetermined period. More specifically, the controller 60 controls the power switching elements Qu1 to Qw2 at a frequency corresponding to the rotation speed obtained in step S104.

The predetermined period is not limited as long as a certain amount of the residual intermediate-pressure refrigerant can be released from the injection pipe 119. However, the predetermined period is preferably set to be sufficiently shorter than the period until the rotor 51 rotating in the reverse direction spontaneously decelerates and stops. For example, the predetermined period may be set so that the total period of the predetermined period and the execution period of the deceleration control is shorter than the period from when the motor-driven compressor 10 stops operating to when the rotor 51 spontaneously decelerates and stops.

Subsequent to the execution of the pre-deceleration control, the controller 60 proceeds to step S106 and executes deceleration control that decelerates the rotor 51. More specifically, the controller 60 gradually decelerates the rotor 51, which is rotating in the reverse direction, at a higher deceleration rate than when the rotor 51 decelerates spontaneously. That is, the controller 60 controls the inverter 55 so that current flows to the obtained d-axis of the rotor 51 and so that the frequency of the phase currents Iu, Iv, and Iw flowing to the motor 16 gradually decreases.

Then, when the rotation speed of the rotor 51 becomes zero or a value close to zero, the controller 60 proceeds to step S107 and executes acceleration control. In detail, the controller 60 first controls the power switching elements Qu1 to Qw2 of the inverter 55 so that the rotation direction of the rotor 51 switches from the reverse direction to the forward direction. Then, the controller 60 gradually accelerates the rotor 51 at a predetermined acceleration rate until the rotation speed of the rotor 51 reaches a target rotation speed. That is, the controller 60 controls the inverter 55 to gradually increase the frequency of the phase currents Iu, Iv, and Iw. When the rotation speed of the rotor 51 reaches the target rotation speed, the controller 60 determines that restarting has been completed and ends the present restart control process. When restarted, the motor-driven compressor 10 is stably operated, that is, the rotor 51 is rotated at the target rotation speed.

The controller 60 may, for example, receive information related to the target rotation speed from the vehicle air-conditioner 100 to obtain the target rotation speed. Further, the controller 60 controls the inverter 55 so that current flows to the q-axis in order to generate torque. The deceleration rate is set in the same manner as the acceleration rate.

The operation of the motor-driven compressor will now be described with reference to FIG. 7.

Figure 7:
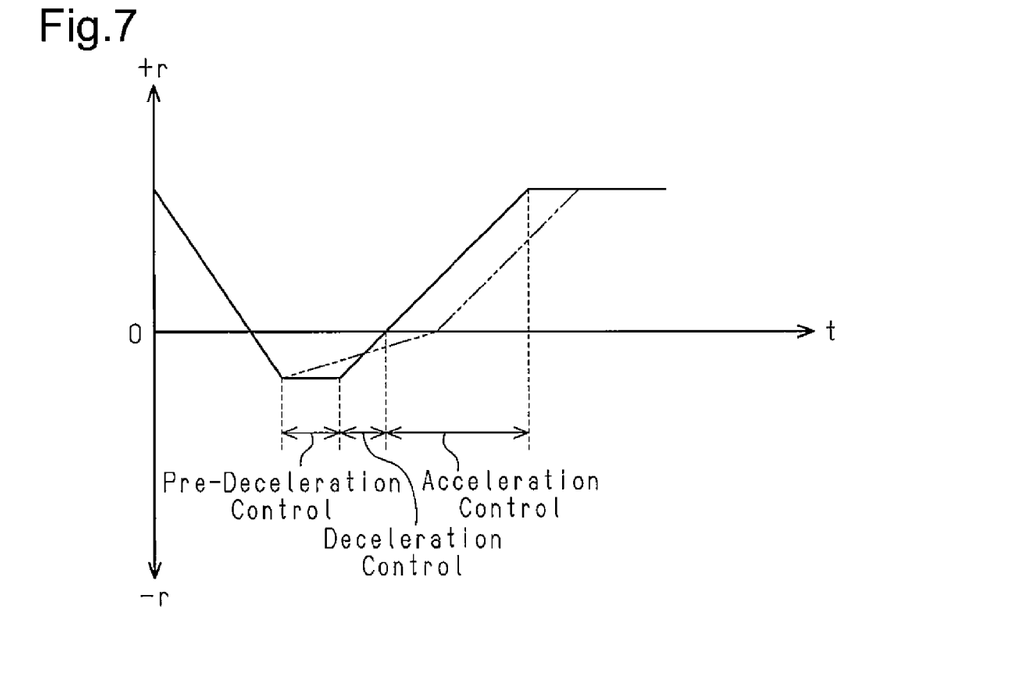
FIG. 7 is a graph illustrating changes in the rotation speed from after the motor-driven compressor stops operating to when the target rotation speed is reached.

As shown in FIG. 7, when the motor-driven compressor 10 stops operating, the rotor 51 decelerates and then rotates in the reverse direction. The double-dashed line in FIG. 7 shows changes in the rotation speed of the rotor 51 when waiting until the rotor 51 stops rotating before restarting rotation of the rotor 51. In this case, it takes time for the reverse rotation of the rotor 51 to stop. This lengthens the time until the rotation speed of the rotor 51 reaches the target rotation speed.

In contrast, as shown by the solid line in FIG. 7, the present embodiment executes the pre-deceleration control when the rotor 51 is rotating in the reverse direction and then executes the deceleration control. This decelerates the rotor 51 at a higher deceleration rate than when the rotor 51 spontaneously decelerates as shown by the double-dashed line in FIG. 7. Then, the rotor 51 rotates in the forward direction and accelerates until reaching the target rotation speed. Thus, compared to when waiting until the rotation of the rotor 51 stops, the rotor 51 reaches the target rotation speed more quickly.

The present embodiment has the advantages described below.

(1) The motor-driven compressor 10 is provided with the motor 16 that includes the rotor 51, the housing 11 that includes the inlet 11a through which the low-pressure refrigerant serving as a low-pressure fluid is drawn, the inverter 55 that drives the motor 16, and the controller 60 that controls the inverter 55. The compression unit 15 includes the fixed scroll 31 that is fixed to the housing 11, the movable scroll 32 that is engaged with the fixed scroll 31 and capable of orbiting the fixed scroll 31, and the compression chamber 33 defined by the fixed scroll 31 and the movable scroll 32. The compression unit 15 compresses the low-pressure refrigerant drawn into the compression chamber 33 when the rotor 51 rotates in the forward direction and the movable scroll 32 orbits in the forward direction. The motor-driven compressor 10 further includes the injection ports 43 that draw the intermediate-pressure refrigerant, which has a higher pressure than the low-pressure refrigerant and a lower pressure than the high-pressure refrigerant, into the compression chamber 33. If the rotor 51 is rotating in the reverse direction when activating the motor-driven compressor 16, the controller 60 obtains the position of the d-axis of the rotor 51 and controls the inverter 55 so that current flows to the obtained d-axis and the frequency of the phase currents Iu, Iv, and Iw flowing to the motor 16 decreases as time elapses.

In this configuration, when a reverse rotation occurs, the motor-driven compressor 10 may be activated without waiting until the rotor 51 stops rotating. This reduces delays in the activation of the motor-driven compressor 10 caused by the reverse rotation. This shortens the activation time until the motor-driven compressor 10 stably operates.

Rotation of the rotor 51 in the reverse direction may be forcibly stopped. This, however, would apply excessive load to the rotor 51 and cause the motor-driven compressor 10 to fall out of synchronization. In contrast, the present invention uses the fact that the torque of the motor 16 is dependent on the q-axis current but not the d-axis current, and the controller 60 executes deceleration control to control the inverter 55 so that current flows to the d-axis and not the q-axis and so that the frequency decreases in the phase currents Iu, Iv, and Iw. In this case, an error may occur between the obtained position of the d-axis of the rotor 51 and the actual position of the d-axis of the rotor 51. Thus, even when the inverter 55 is controlled so that current flows to the obtained d-axis, current may also actually flow to the q-axis and generate a non-excessive torque. Accordingly, by controlling the inverter 55 so that current flows to the obtained d-axis and so that the frequency of the phase currents Iu, Iv, and Iw decreases as time elapses, the rotor 51 may be decelerated more quickly than when spontaneously decelerated without generating excessive torque. This limits situations in which the motor-driven compressor 10 falls out of synchronization and allows for quick activation of the motor-driven compressor 10. Thus, the motor-driven compressor 10 may be efficiently activated.

(2) The inverter 55 includes the power switching elements Qu1 to Qw2. The controller 60 controls the activation and deactivation of the power switching elements Qu1 to Qw2. In this configuration, by controlling the activation and deactivation of the power switching elements Qu1 to Qw2, the flow of current to the obtained d-axis and the frequency of the phase currents Iu, Iv, and Iw may be controlled. Thus, even when the rotor 51 is rotating in the reverse direction, the motor-driven compressor 10 may be quickly activated.

(3) The motor-driven compressor 10 is a three-phase motor. The motor-driven compressor 10 includes the current sensor 61 that detects the phase currents Iu, Iv, and Iw. Based on the detection result of the current sensor 61, the rotor 51 obtains the rotational position (i.e., zero point) of the rotor 51 that is rotating in the reverse direction. Then, the controller 60 executes deceleration control that decelerates the rotor 51 based on the obtained zero point of the rotor 51. In this configuration, the position of the d-axis of the rotor 51 may be obtained when the rotor 51 is rotating in the reverse direction from the obtained zero point. This allows the deceleration control to be executed without using a position sensor that detects the rotational position of the rotating rotor 51.

(4) The controller 60 obtains point P2, at which the maximum instantaneous value of the three phase currents Iu, Iv, and Iw switches from the w-phase current Iw to the v-phase current Iv. Then, the controller 60 obtains the position of the d-axis of the rotor 51 from the obtained point P2. In this configuration, the position of the d-axis of the rotor 51 may be obtained without performing a complicated calculation.

(5) If the rotor 51 is rotating in the reverse direction when activating the motor 16, the pre-deceleration control is executed before the deceleration control. In the pre-deceleration control, the controller 60 executes a process for obtaining the rotation speed of the rotor 51 that is rotating in the reverse direction from the detection result of the current sensor 61. Further, the controller 60 controls the inverter 55 so that current flows to the obtained d-axis of the rotor 51 and so that the frequency of the phase currents Iu, Iv, and Iw corresponds to the frequency of the obtained rotation speed. This allows the pre-deceleration control to release the residual intermediate-pressure refrigerant from the injection pipe 119. Thus, the intermediate-pressure refrigerant does not impede the activation of the motor-driven compressor.

(6) The motor-driven compressor 10 is installed in a vehicle for use with the vehicle air-conditioner 100. The vehicle air-conditioner 100 that includes the motor-driven compressor 10 is installed in the vehicle and may thus be used in a cold environment. When used in a cold environment, the density of the refrigerant decreases, and the performance of the motor-driven compressor 10 has a tendency to fall. Thus, in the present embodiment, the intermediate-pressure refrigerant is drawn through the injection ports 43 into the compression chamber 33 to improve the performance of the motor-driven compressor. In this case, however, the rotor 51 may be reversely rotated when stopping the operation of the motor-driven compressor 10. Thus, the time used to restart the motor-driven compressor 10 has a tendency to increase. Further, the operation of the motor-driven compressor 10 is stopped and restarted by an operation performed by the user or in accordance with the condition in which the vehicle is driven. Thus, a long restarting time would lower the comfort of the passenger compartment. In contrast, the present embodiment executes the deceleration control so that the motor-driven compressor 10 quickly returns to a stable operation state even when the rotor 51 is reversely rotated. This limits decreases in the performance of the vehicle air-conditioner 100 when the temperature is low and improves the comfort of the passenger compartment.

It should be apparent to those skilled in the art that the present invention may be embodied in many other specific forms without departing from the spirit or scope of the invention. Particularly, it should be understood that the present invention may be embodied in the following forms.

Figure 8:
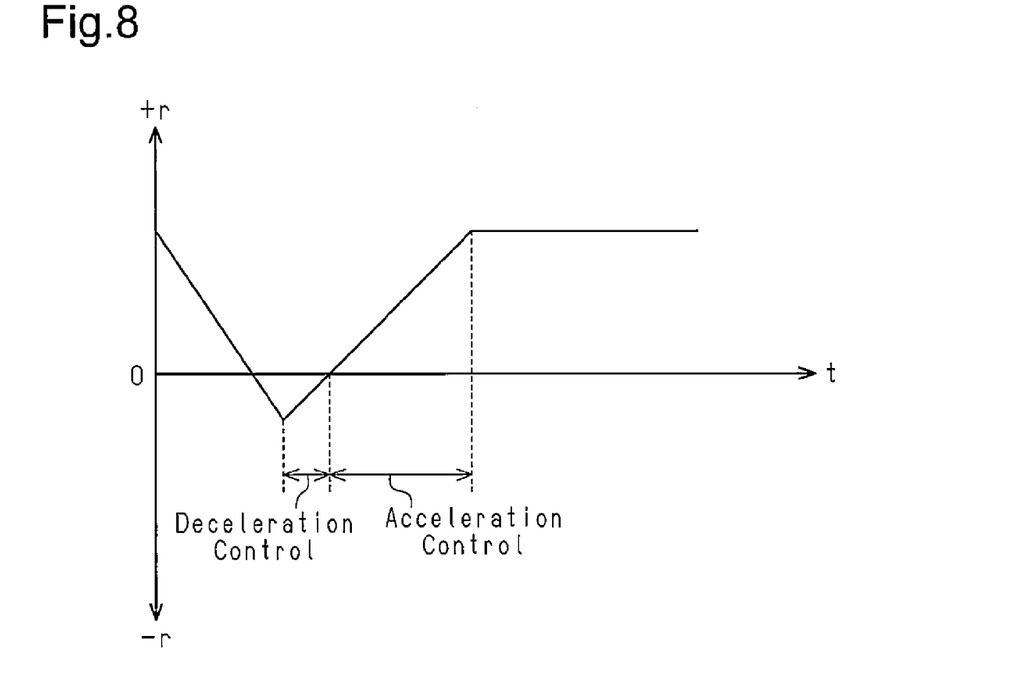
FIG. 8 is a graph illustrating restarting of the motor-driven compressor in a further example.

As shown in FIG. 8, the pre-deceleration control may be omitted. If the rotor 51 is rotating in the reverse direction when activating the motor 16, the deceleration control is executed without executing the pre-deceleration control. In this case, the motor-driven compressor 10 is started more quickly.

The deceleration rate of the deceleration control may differ from the acceleration rate of the acceleration control. For example, the deceleration rate when decelerating the rotor 51 that is rotating in the reverse direction may be higher than the acceleration rate when accelerating the rotor 51 that is rotating in the forward direction. On the other hand, the deceleration rate may be lower than the acceleration rate.

When the rotation speed of the rotor 51 is higher than or equal to a threshold rotation speed, the rotational position (zero point) of the rotor 51 may be obtained with a large error under a situation in which the rotation speed is relatively high. In this case, when the pre-deceleration control or the deceleration control is executed, a large torque may be generated when current flows to the rotor 51. To avoid such a situation, when the rotation speed obtained in step S104 is higher than or equal to the threshold rotation speed, the controller 60 may wait until the rotation speed becomes lower than the threshold rotation speed before executing the pre-deceleration control or the deceleration control. This reduces situations in which the pre-deceleration control or the deceleration control is executed when the rotational position (zero point) of the rotor 51 has a large error.

The motor-driven compressor 10 may include a position sensor that detects the rotational position of the rotor 51. In this case, the controller 60 obtains the rotational position of the rotor 51 based on the detection result of the position sensor. This may also produce an error between the position of the d-axis obtained by the position sensor and the actual position of the d-axis.

Instead of or in addition to the current sensor 61, the motor-driven compressor 10 may include a voltage sensor that is capable of detecting the induced voltage. In this case, the controller 60 obtains the rotational position of the rotor 51 based on the detection result of the voltage sensor (e.g., zero cross point of u-phase induced voltage).

The current sensor 61 may be connected to an upper arm. The motor 16 does not have to be a three-phase motor. Further, the inverter 55 does not have to be a three-phase inverter.

The injection ports 43 may be provided in any number and at any location.

The motor-driven compressor 10 does not have to be installed in a vehicle and may be installed in any subject.

The controller 60 may estimate the position of the d-axis of the rotor 51 after a predetermined specific period elapses based on an advancement angle estimated from the obtained position of the d-axis of the rotor 51 and the obtained rotation speed of the rotor 51 to execute the pre-deceleration control or the deceleration control in correspondence with the position of the estimated position of the d-axis of the rotor 51.

The motor-driven compressor 10 may be applied to a device other than the vehicle air-conditioner 100. For example, in a fuel cell vehicle (FCV) that uses a fuel cell, the motor-driven compressor 10 may be applied to a device that supplies air to the fuel cell. In this manner, the fluid that is subject to compression is not limited and may be refrigerant or air.

The present examples and embodiments are to be considered as illustrative and not restrictive, and the invention is not to be limited to the details given herein, but may be modified within the scope and equivalence of the appended claims.

The invention claimed is:
1. A motor-driven compressor comprising:
a motor including a rotor;
a housing including an inlet through which low-pressure fluid is drawn;
a compression unit that compresses the low-pressure fluid and discharges compressed high-pressure fluid, wherein
the compression unit includes a fixed scroll fixed to the housing, a movable scroll engaged with the fixed scroll and capable of orbiting the fixed scroll, and a compression chamber defined by the fixed scroll and the movable scroll, and
the compression unit compresses the low-pressure fluid drawn into the compression chamber when the rotor rotates in a predetermined forward direction by orbiting the movable scroll in a forward direction;
a drive circuit that drives the motor;
a controller that controls the drive circuit;
an injection port that draws into the compression chamber intermediate-pressure fluid having a higher pressure than the low-pressure fluid and a lower pressure than the high-pressure fluid; and
a position obtaining unit that obtains a position of a d-axis of the rotor,
wherein if the rotor is rotating in a reverse direction that is opposite to the forward direction when activating the motor, the controller executes a deceleration control that controls the drive circuit so that current flows to the d-axis of the rotor obtained by the position obtaining unit and so that frequency of current flowing to the motor decreases as time elapses.

2. The motor-driven compressor according to claim 1, wherein
the drive circuit is an inverter including a plurality of switching elements, and
the controller controls activation and deactivation of the switching elements.

3. The motor-driven compressor according to claim 1, wherein the motor is a three-phase motor, the motor-driven compressor further comprising:
a current detector that detects current of each phase of the motor; and
a rotation speed obtaining unit that obtains a rotation speed of the rotor when rotating in the reverse direction from a detection result of the current detector,
wherein if the rotor is rotating in the reverse direction that is opposite to the forward direction when activating the motor, prior to execution of the deceleration control, the controller executes a pre-deceleration control that controls the drive circuit so that current flows to the d-axis of the rotor obtained by the position obtaining unit and so that a frequency of the current flowing to the motor corresponds to a frequency corresponding to the rotation speed of the rotor obtained by the rotation speed obtaining unit.

4. The motor-driven compressor according to claim 3, wherein
the position obtaining unit obtains a point where the maximum phase currents among the three phase currents detected from the detector switches, and
the position obtaining unit uses the obtained point to obtain the position of the d-axis of the rotor as a rotational position of the rotor.

5. The motor-driven compressor according to claim 1, wherein the motor-driven compressor is installed in a vehicle for use with a vehicle air-conditioner.

6. The motor-driven compressor according to claim 1, wherein when the rotor is rotating in the reverse direction at a rotation speed that is greater than or equal to a predetermined threshold rotation speed, the controller waits until the rotation speed becomes lower than the threshold rotation speed before executing the deceleration control.

7. The motor-driven compressor according to claim 1, wherein subsequent to the execution of the deceleration control and after a rotation direction of the rotor switches from the reverse direction to the forward direction, the controller executes acceleration control that gradually accelerates the rotor until the rotation speed of the rotor reaches the target rotation speed.

* * * * *